UNITED STATES PATENT OFFICE.

DANIEL MAYON AND ERASTUS CHAMPLAIN, OF CLOVERDALE, CALIFORNIA.

IMPROVEMENT IN MEDICAL COMPOUNDS FOR THE CURE OF DYSPEPSIA, &c.

Specification forming part of Letters Patent No. 130,518, dated August 13, 1872.

SPECIFICATION.

*To all whom it may concern:*

Be it known that we, D. MAYON and E. CHAMPLAIN, of Cloverdale, Sonoma county, in the State of California, have invented or discovered an Improved Medicinal Preparation for the Cure of Dyspepsia; and we do hereby declare that the following is a full, clear, and exact description of the method and process employed in the production of our medicinal preparation, with full directions for its use when made.

Our invention or discovery relates to a new medicinal preparation which we call "Mayon and Champlain's Ligneous Extract" for the treatment and cure of indigestion or dyspepsia. Our medicinal preparation consists of the extract of wood, and this extract we produce in the following manner: The wood to be used is first cut into lengths similar to ordinary cord-wood, say four feet long, this being the most convenient length, and a quantity—say four or five cords—is piled up in a manner similar to that employed in constructing an ordinary carbonizing pit. A vertical hole must be left in the center of this pit. The pile of wood is then covered to the depth of four or five inches with straw, and upon the straw a layer of earth of equal thickness is placed. After this the pit is fired at the bottom in the manner of firing an ordinary charcoal-pit. After the pit has become well ignited I take a conducting-tube, A, of the proper length, one end of which is connected with a metal condenser, B, and insert the open end of the tube through the straw and earth into the hole in the pit. The smoke will pass up through the conducting-tube A and into the condenser B, where it will be condensed and form the extract. From the condenser the extract can be drawn into bottles for use.

For old and long standing cases of dyspepsia one tea-spoonful of the extract should be taken three times a day before meals in a table-spoonful of water for three days. Then for three days more the same amount of the extract should be taken without water, after which for six days, one tea-spoonful should be taken half an hour before breakfast.

If the above directions be followed the most stubborn cases of chronic dyspepsia can be almost invariably cured within the number of days above mentioned.

Any kind of wood can be used in making this extract.

Having thus described our invention, what we claim and desire to secure by Letters Patent, is—

1. The medicinal preparation or extract above described, for the purpose above described.

2. The process above described for producing our ligneous extract.

In witness whereof we hereunto set our hands and seals.

DANIEL MAYON. [L. S.]
ERASTUS CHAMPLAIN. [L. S.]

Witnesses:
JOS. L. DOUGHERTY,
M. KLINE.